Nov. 16, 1965  W. FUCHS  3,217,888
FILTER FOR DRINKING WATER
Filed Aug. 22, 1961  2 Sheets-Sheet 1

INVENTOR.
WALTER FUCHS
ATTORNEY

INVENTOR.
WALTER FUCHS
ATTORNEY

United States Patent Office 3,217,888
Patented Nov. 16, 1965

3,217,888
FILTER FOR DRINKING WATER
Walter Fuchs, Rua Paracaima 245, Rio de Janeiro, Brazil
Filed Aug. 22, 1961, Ser. No. 133,176
2 Claims. (Cl. 210—266)

This invention relates to a filter for drinking water.

The primary object of the invention is to provide a filter device which offers a substantial improvement in the quality of filtered water with respect to reduction of water content detrimental to health and with respect to taste.

A further object is to provide a filter which is simple and economical to manuufacture and assemble and which presents advantages in its operation.

The filter produced according to this invention obtains these advantages by providing ceramic filter elements which consist of sintered plates interconnected to define a hollow chamber. The material for the plates utilizes a substance which has a sterilization effect and the plates are made of a composition of the type common in the art of filters and preferably a mixture of kaolin, feldspar, quartz, diatomite and like sinterable materials. In order to increase and assure the germ-killing effect the ceramic plates may be impregnated with a substance having an oligo-dynamic effect especially with metal salts, e.g., with a silver nitrate solution or copper salts.

The filter elements may be formed of round or square plates having a marginal flange defining a recessed face. The filter elements may be employed individually but preferably are employed in a group adjacent each other. The filter elements offer a large surface to the passage of water or large penetration volume with a correspondingly high filtering effect, and they have a long life. They avoid ineffectual dead spaces and require little space or volume in a filtering apparatus.

The filter plates may be produced by a pressing operation to secure uniform overall wall thickness and manufacturing advantages as compared to prior ribbed filters which must be produced by a casting or molding process. The formation of the filter plates by a pressing operation avoids the necessity of grinding of the filter plates as is customary in the manufacture of ribbed filters. Furthermore, this method of manufacture permits the production of large filter plates with a high filter capacity to insure prolonged operation of the filter in which they are used in a dependable and economic manner.

In order to preserve the full effect of the new filter plates by virtue of their large surface area for the greatest period of time, this invention contemplates the withdrawal from the water to be treated, especially tap water, of substances which could adversely affect the filtering capacity of the plates, prior to supply of water to the plates. Thus, it is an object of the invention to insert a wash filter in the filtering apparatus adjacent the inlet to separate from the water foreign matter contained therein, such as suspended material, phenols, impurities of industrial origin and free chlorine. This wash filter may include any suitable water-treating material, such as activated carbon in varying particle size or a synthetic chlorine-cation-exchange material, e.g. in the form of granules which do not cake together and which have a relatively low resistance to the passage of water.

Other objects will be apparent from the following specification.

Figure 1:
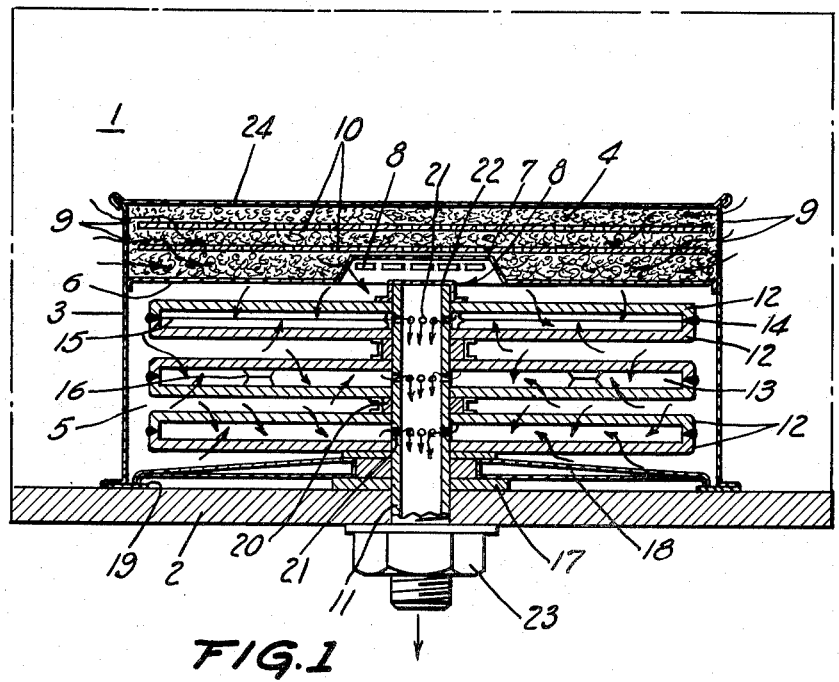
FIG. 1 is a central vertical sectional view of one embodiment of the invention.

Referring to the drawings, and particularly to FIG. 1 thereof, which illustrates one embodiment of the invention, the numeral 1 illustrates schematically a water container having a suitable inlet (not shown) and a bottom 2. A housing having side walls 3 and a top 24 is mounted upon the bottom 2. The housing wall 3 may be cylindrical or rectangular in outline and may be formed of sheet metal or synthetic material. A partition 6 intermediate the height of the housing wall 3 spans the same to divide the housing into an upper preliminary or wash filter chamber 4 and a lower main filter chamber 5. The central portion 7 of the partition 6 is preferably raised and provided at its sides with small apertures 8. The upper chamber 4 has openings in the walls 3 at 9. The upper chamber 4 is filled with water-treating material which may consist of granulated activated coal or a synthetic chlorine-cation-exchange material. One or more apertured plates 10, preferably having apertures disposed uniformly throughout, are located at different levels within the water-treating material within the chamber 4.

The bottom 2 of the container has an opening in which is fixedly mounted a central pipe or tube 11 positioned vertically and terminating adjacent and slightly below the level of the central raised portion 7 of the plate 6. The pipe 11 carries the main filter elements. These filter elements consist of superimposed horizontal sintered ceramic plates having a dished face and shallow marginal flanges. The plates 12 are arranged in pairs with their marginal flanges contacting to define a hollow space therebetween. The plate pairs 12 are marginally united or bonded at 14 in any suitable manner.

The filter plates 12 are formed preferably of a mixture of kaolin, feldspar, quartz, diatomite and like sinterable material, which mixture is sintered in a furnace at about 1200° C., after sifting and decanting, and is pressed to desired form. This method of production produces a porous plate having form stability. The plates are impregnated with an oligo-dynamic material, such as a solution of silver nitrate, copper salts or other metal salts, to impart a bacteriological sterilization effect thereto. If desired, the individual plates 12 may be provided at their inner faces with ribs 15 or raised portions 16 to provide adequate strength thereof.

A base member 17 rests upon the container bottom 2 surrounding the pipe 11. The base member 17 is engaged by a plate-like leaf spring 18 encircling a portion of the base and having a downturned marginal flange 19 which contacts the container bottom 2 or a flange of wall 3. The filter plates 12 have central apertures which fit snugly around the pipe 11. Spacer rings 20 encircle the pipe 11 and are interposed between adjacent filter plate units or pairs to expose the outer surface of each filter unit. At the level of the space or chamber 13 within each filter unit the pipe 11 is provided with a plurality of openings 21 to permit communication between the chamber 13 of the filter and the interior of the pipe 11.

A cap or closure 22 is mounted upon the upper end of the pipe 11 to seal the same and preferably bears upon the upper filter unit. A nut 23 threaded upon the lower exposed end of the pipe 11 bears against the container bottom 2 and, when tightened, operates with the cap 22 to hold the filter units and spacers in desired relation. Any suitable sealing means (not shown) may be provided to prevent leakage through the bottom wall aperture around the pipe 11. Also, the contact of the leaf spring 18 with container bottom at 19 assists in preventing leakage through the bottom opening. The top 24 is preferably removable to permit access to the parts for assembly, reconditioning repair and replacement of filter units.

While the pipe 11 has been illustrated herein as a unitary tubular member, it will be understood that it may be formed in multiple sections, if desired. Alternatively, the filter units may have interfitting nipples projecting at the top and bottom of each. In either integral or sectional form it is contemplated that the construction will facilitate exchange of the filter units 12 as desired.

In use, water within the container 1 enters the upper wash filter chamber 4 through the openings 9 and seeps through the activated carbon or other filler material within the chamber 4. Where employed, the apertured plates 10 assist in securing uniform distribution of flow of water through the filler material. The filler material within the chamber 4 serves to separate from the water suspended substances, phenols, impurities and the like, and also serves to dechlorinate the water. After the water has seeped through the filler material in the chamber 4, it passes through the apertures 8 to enter the lower filter chamber 5. Water in the lower chamber 5 penetrates through the porous plates 12 into the inner chambers 13 of the filter units. The material of which the plates 12 is formed permits the penetration of water therethrough, and the impregnation thereof with a metal salt or other substances having an oligo-dynamic effect serves to sterilize the water, that is, to exert a bacteria-killing effect on the water. The filtered water flows in the chambers 13 and through the apertures 21 to enter the pipe 11 for gravitational flow to the outlet of the pipe.

In the event the upper filter chamber 4 and its content is eliminated, water may be supplied to the chamber containing the filter elements 12 through the top of the chamber, as through openings 8.

Figure 2:
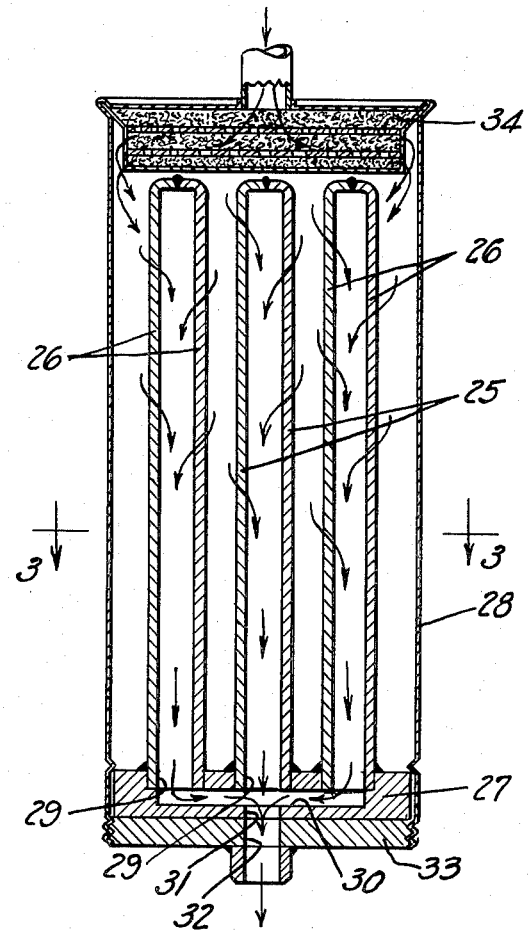
FIG. 2 is a central vertical sectional view illustrating another embodiment of the invention.
Figure 3:
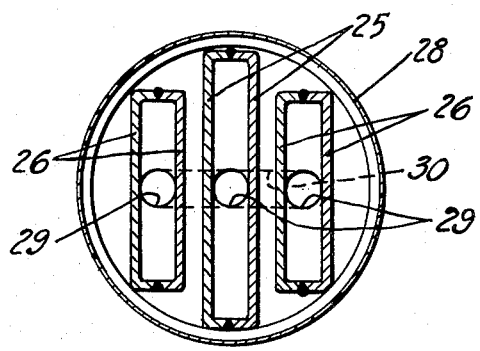
FIG. 3 is a transverse sectional view taken on line 3—3 of FIG. 2.

The embodiment of the invention illustrated in FIGS. 2 and 3 differs from that of FIG. 1 essentially by the arrangement of the filter units in upstanding or substantially vertical position. The filter units in this embodiment preferably constitute rectangular plates 25, 26 having a dished contour defined by marginal flanges at the sides and the top thereof. These plates are formed of the same material as the plates 12 of the embodiment illustrated in FIG. 1. The plates are bonded or united at their marginal side and top flanges and define an opening at their lower ends. The lower ends of the plates 25, 26 fit within apertures in a base 27 of a filter housing 28. Plates 25, 26 are preferably bonded to the base 27 at end portions 29 thereof. The base 27 has a passage 30 therein with which the lower ends of the filter plates 25, 26 communicate. An opening 31 communicates with passage 30 and leads to a discharge opening 32 in an outer bottom housing wall 33.

A preliminary or wash filter 34 is arranged in the upper portion of housing 28 and may be formed of material comparable to that utilized and disclosed above in connection with the FIG. 1 construction. Water travels from a central inlet at the upper end of the housing 28 into the wash filter and through the same to the lower chamber and into the filter units therein and thence through passages 30, 31, 32 to an outlet, in a flow as designated by the arrows in FIG. 2.

Figure 4:
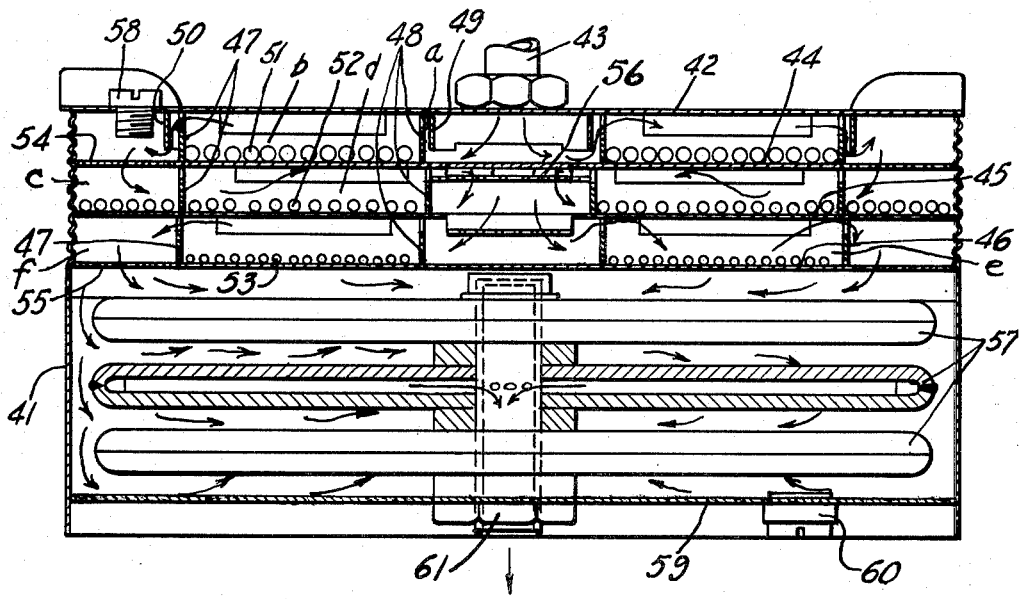
FIG. 4 is an axial sectional view of still another embodiment of the invention.

The embodiment of the invention illustrated in FIG. 4 differs from that of FIG. 1 essentially as to the specific construction of the upper preliminary or wash filter unit. In this construction the housing has a cylindrical wall 41 whose upper portion is preferably screw-threaded. The housing also has a bottom 59 and a removable top 42. Three vertically spaced partitions 44, 45 and 46 span the upper part of the housing and may be threaded therein. The top of the unit mounts inlet conduit 43.

Each of the partitions, 44, 45 and 46 supports at a given distance from the margin a concentric cylindrical wall 47 having a plurality of notches or openings in its upper margin. A second smaller cylindrical wall 48 having similar notches at its upper margin is mounted on each partition 44, 45 and 46 in concentric relation to the wall 47 and the container. A cylindrical wall 49 depends from the cover 42 and is of smaller diameter than cylindrical wall 48 and is concentric therewith so as to provided a small clearance space $a$ between the cylindrical members 48 and 49. A second cylindrical wall 50 of larger diameter than the outer wall 47 is concentric therewith to provide a clearance space between parts 47 and 50.

The annular chamber defined by the walls 47 and 48 and by the cover 42 and the top partition 44 is substantially filled with coarse particles of activated carbon 51. The portion of the central partition 45 outwardly of the cylindrical wall 48 supports a filler of finer particles of activated carbon 52. The lower partition 46 supports a filler of a synthetic granular cation-permutator 53 between walls 47 and 48.

The portions of the partitions 44 and 46 located outwardly of the adjacent cylindrical walls 47 are provided with apertures 54 and 55, respectively, to define a sieve-like construction. The cylindrical wall 48 between the partitions 44 and 45 is spanned by a perforated plate 56.

The portion of the housing below the partition 46 contains one or more bonded or united pairs of filter plates 57 which correspond to the construction of the filter units 12, 13 and 14 of FIG. 1, as concerns their arrangement, their structure, and the material of which they are made.

The top or cover 42 of the housing 41 is preferably provided with an aerating opening adapted to be closed by screw-threaded closure member 58. The bottom 59 of housing 41 is also provided with an opening normally closed by a closure member 60.

The fluid paths of the drinking water to be purified in its travel through the filter construction are represented in FIG. 4 by means of numerous arrows. The inlet chamber outlined by cylindrical wall 49 serves to retard turbulence of the water as it enters from inlet 43. The water passes from this chamber through the clearance space $a$ between the parts 48 and 49 and thence through openings in parts 48 to enter the annular chamber $b$ and flow through said annular chamber and the granular material 51 therein to deposit on said granular material any suspended substances contained in the water. The water is also subjected to the absorption properties of the granular material 51 which assist in removing foreign material therefrom. Water flows from the chamber $b$ through the notches in the wall 47 and the clearance space between the wall 47 and the wall 50 and thence by gravity flows through the openings in the sieve-like portion 54 to enter the annular chamber $c$ between partitions 44 and 45. Water then flows inwardly from annular chamber $c$ through the notches in the adjacent wall 47 to pass into the chamber $d$ and the granular material 52 therein. The granular material 52 is preferably of finer grain size than the material 51 and provides the first dechlorination step and also provides pre-sterilization of the water. Water then passes from chamber $d$ through the notches in the adjacent wall 48 into the chamber outlined by wall 48 and through the apertured plate 56 and then flows by gravity through a central opening in the partition 45 into the chamber outlined by the lowermost member 48 between the partitions 45 and 46. Thence the water flows through apertures in said lowermost cylindrical wall 48 into the chamber $e$ and through the granular material 53 therein. The granular material 53 is a fine grain size synthetic cation-permutator filler which causes further dechlorination of the water which flows therethrough. Water then flows from chamber $e$ through notches in the outer wall 47 into the chamber $f$ and thence by gravity through the sieve-like portion 55 into the lower chamber of the housing in which the filter units 56 are located for ultimate discharge at the outlet 61.

If desired the walls 51 of the housing may be provided with an inner layer (not shown), such as a sterilization layer formed of silver salts.

In each of the embodiments of the invention effective filtration of drinking water is provided. Also, in cases where the wash filters or preliminary filters are employed, effective dechlorination of the water occurs and suspended substances in the water are deposited so as to prevent clogging of the main filter. This wash filter thus increases the sterilization effect accomplished by the device in both qualitative and quantitative respect. Additionally, the presence of the wash filter substantially increases the effective life of the ceramic filter units 12, 14, 25, 26 and 57, respectively, of the different embodiments.

While the preferred embodiments of the invention have been illustrated and described, it will be understood that changes in the construction may be made within the scope of the appended claims without departing from the spirit of the invention.

I claim:

1. In a filter for water, a housing having an inlet and an outlet, a partition dividing said housing into a first chamber communicating with said inlet and a second chamber communicating with said outlet, a plurality of sintered ceramic filter units in said second chamber, each filter unit having a central opening and comprising a pair of porous plates having confronting dished faces and marginally bonded to define a cavity therein, tubular means supporting said filter units in spaced relation and apertured in communication with said filter cavities, said tubular means being connected to said outlet, and granular water treating material in said first chamber, said partition having apertures, flow of water occurring from said inlet through said granular material, thence through said apertures into said second chamber and thence through said filter units to and through said cavities and tubular means to said outlet, and a plurality of spaced substantially horizontal partitions positioned in said granule-containing first chamber, notched cylindrical walls carried by said last named partitions and cooperating therewith to define a circuitous flow path through said first chamber, the granular water-treating material in said first chamber being disposed in said flow path.

2. In a filter for water, a housing having an inlet and an outlet, a partition dividing said housing into a first chamber communicating with said inlet and a second chamber communicating with said outlet, a plurality of sintered ceramic filter units in said second chamber, each filter unit having a central opening and comprising a pair of porous plates having confronting dished faces and marginally bonded to define a cavity therein, tubular means supporting said filter units in spaced relation and apertured in communication with said filter cavities, said tubular means being connected to said outlet, and granular water treating material in said first chamber, said partition having apertures, flow of water occurring from said inlet through said granular material, thence through said apertures into said second chamber and thence through said filter units to and through said cavities and tubular means to said outlet, and a plurality of spaced substantially horizontal partitions positioned in said granule-containing first chamber, spaced inner and outer apertured endless wall means carried by said last named partitions and cooperating therewith to define plural inter-communicating compartments in said first chamber, said granular water-treating material being confined within selected compartments.

References Cited by the Examiner

UNITED STATES PATENTS

| | | | |
|---|---|---|---|
| 260,106 | 6/1882 | Long | 210—266 |
| 605,883 | 6/1898 | Kuersten | 210—346 X |
| 2,408,130 | 9/1946 | Vokes et al. | 210—435 X |
| 2,595,290 | 5/1952 | Quinn | 210—501 |
| 2,738,105 | 3/1956 | Wolfer et al. | 210—488 X |
| 2,916,144 | 12/1959 | Langnickel | 210—486 X |
| 3,141,845 | 7/1964 | Nadhenry | 210—345 X |

REUBEN FRIEDMAN, *Primary Examiner.*

HERBERT L. MARTIN, *Examiner.*